United States Patent
Cho

(10) Patent No.: US 9,411,949 B2
(45) Date of Patent: Aug. 9, 2016

(54) ENCRYPTED IMAGE WITH MATRYOSHKA STRUCTURE AND MUTUAL AGREEMENT AUTHENTICATION SYSTEM AND METHOD USING THE SAME

(75) Inventor: Sung Woo Cho, Gwangjin-gu (KR)

(73) Assignee: OLCORPS CO., LTD, Seoul (KR)

( * ) Notice: Subject to any disclaimer, the term of this patent is extended or adjusted under 35 U.S.C. 154(b) by 1245 days.

(21) Appl. No.: 12/616,231

(22) Filed: Nov. 11, 2009

(65) Prior Publication Data

US 2010/0125734 A1    May 20, 2010

(30) Foreign Application Priority Data

Nov. 17, 2008    (KR) ........................ 10-2008-0113957

(51) Int. Cl.
| | |
|---|---|
| *H04L 9/32* | (2006.01) |
| *G06F 21/36* | (2013.01) |
| *H04W 12/06* | (2009.01) |
| *G06Q 20/34* | (2012.01) |
| *H04L 9/08* | (2006.01) |

(52) U.S. Cl.
CPC .............. *G06F 21/36* (2013.01); *G06Q 20/341* (2013.01); *H04L 9/32* (2013.01); *H04W 12/06* (2013.01); *H04L 9/08* (2013.01)

(58) Field of Classification Search
CPC ........................... H04L 63/0869; G06F 21/36
USPC ........................................................ 713/169
See application file for complete search history.

(56) References Cited

U.S. PATENT DOCUMENTS 6,256,391 B1*    7/2001   Ishiguro et al. ............... 380/203

FOREIGN PATENT DOCUMENTS

KR    10-2007-0045556 A    5/2007

OTHER PUBLICATIONS

Mohammed Misbahuddin et al. "A User Friendly Password Authenticated Key Agreement for Multi Server Environment," ACM, Jan. 23-24, 2009, pp. 113-119.*
Greg Rose, "Multiple Fingers Synchronization Used for Device Mutual Authentication," Jun. 11, 2009, pp. 1-8.*

* cited by examiner

*Primary Examiner* — Luu Pham
*Assistant Examiner* — Canh Le
(74) *Attorney, Agent, or Firm* — Paratus Law Group, PLLC

(57) ABSTRACT

The present invention relates to an encrypted image with a matryoshka structure and a mutual agreement authentication system and method using the same. The encrypted image with a matryoshka structure is used in authentication in an authentication system having a plurality of layers and comprises: a first encrypted image which can be opened by only a server of any one layer of the authentication system; and a second encrypted image which can be opened by only a server of another layer distinguished from the any one layer, wherein any one sealed encrypted image of the first and second encrypted images is embedded and sealed in the other encrypted image.

18 Claims, 13 Drawing Sheets

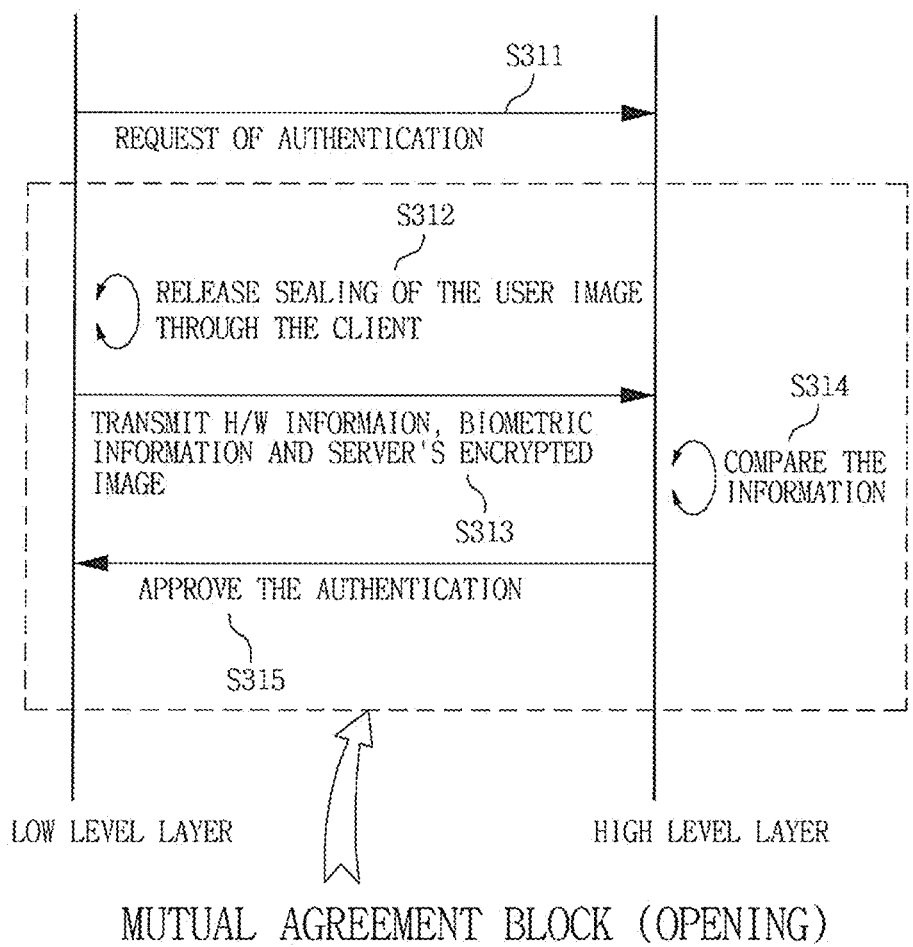

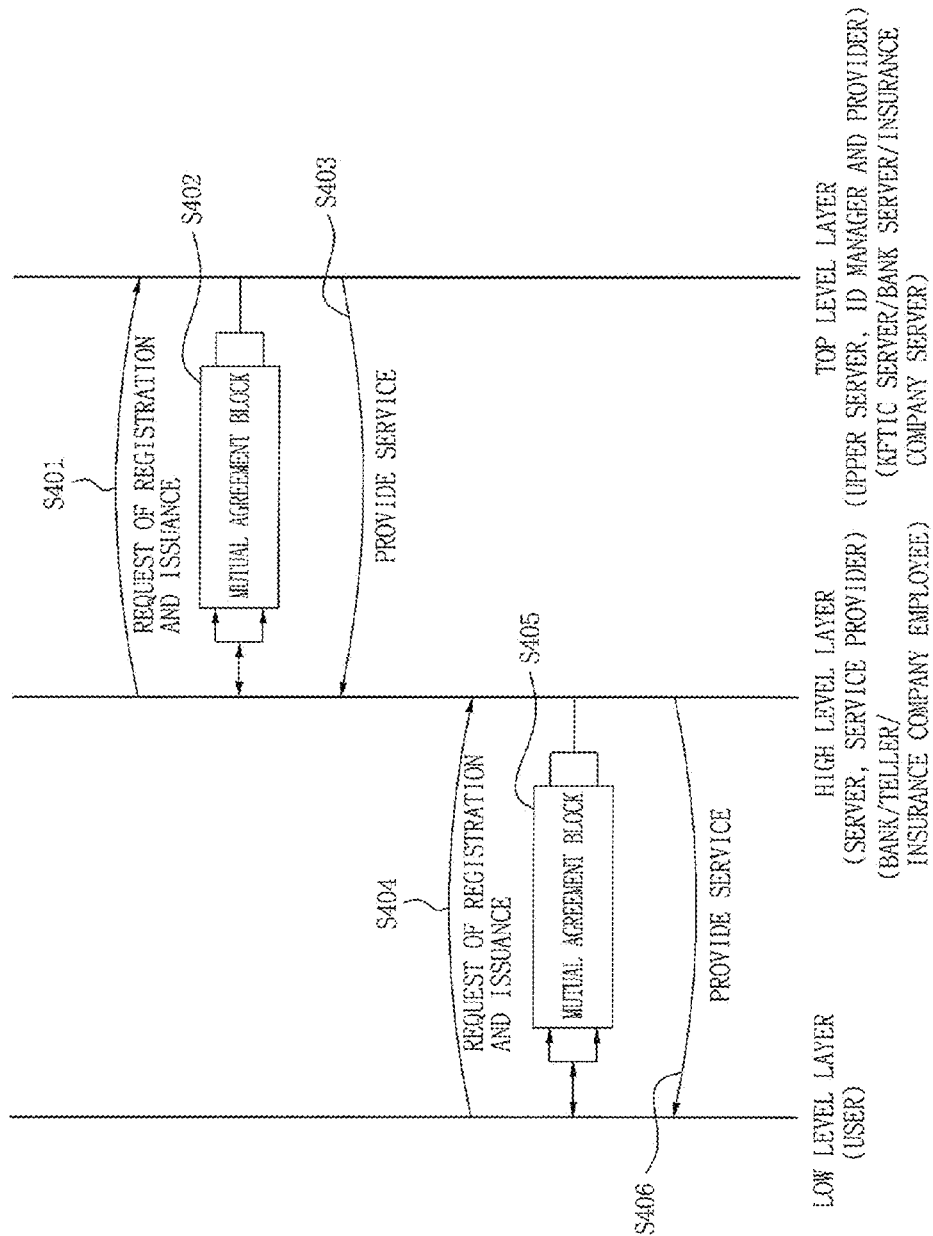

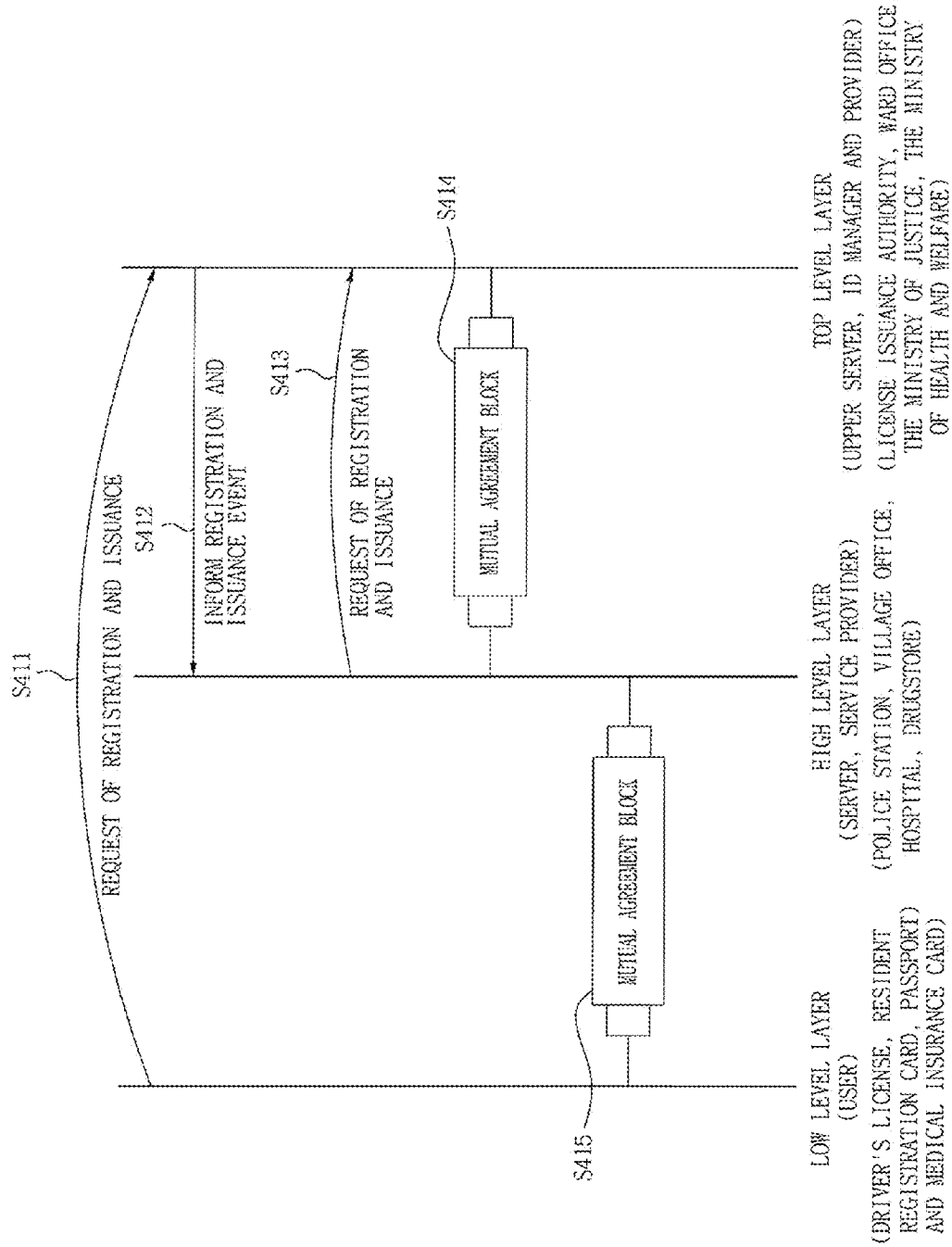

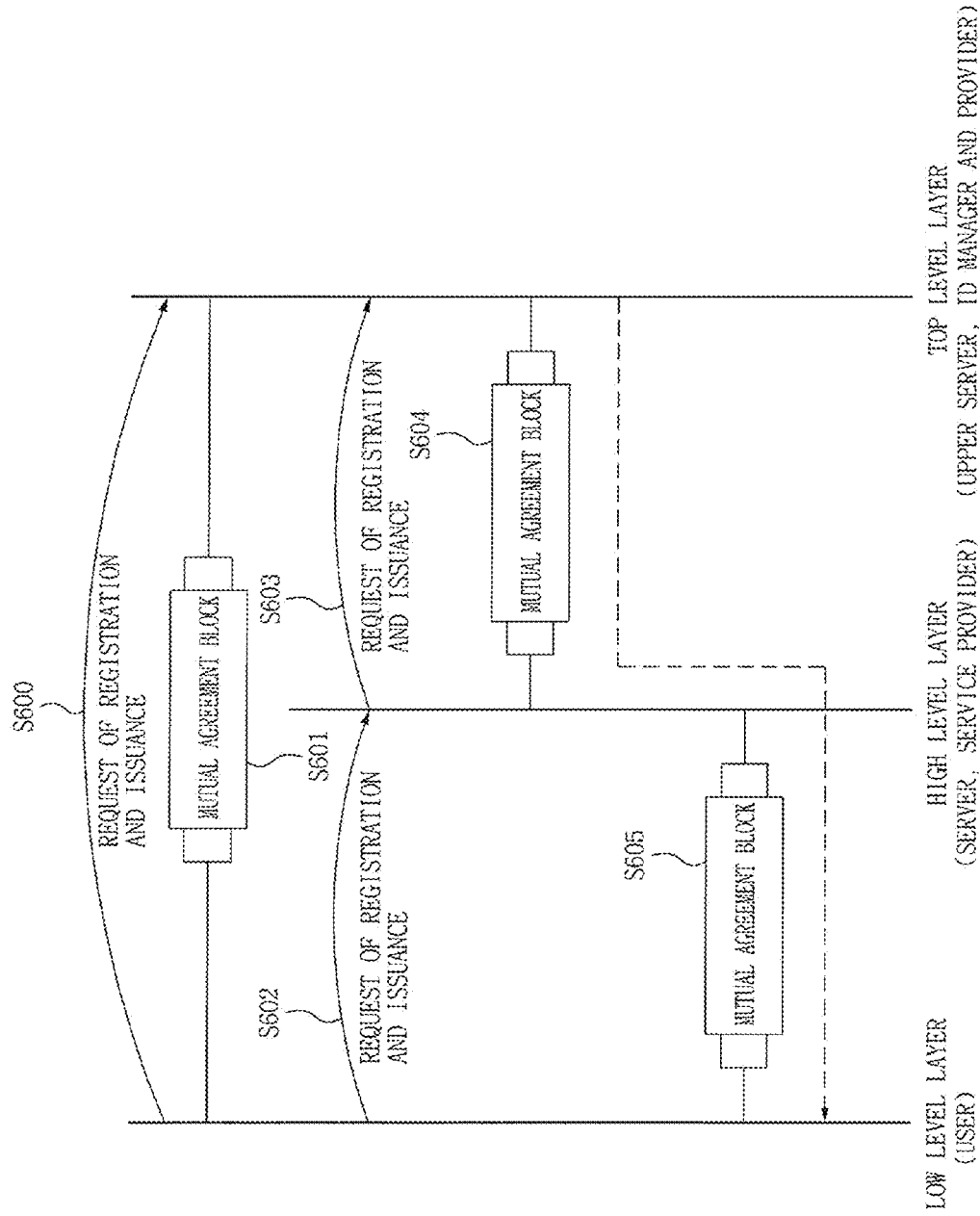

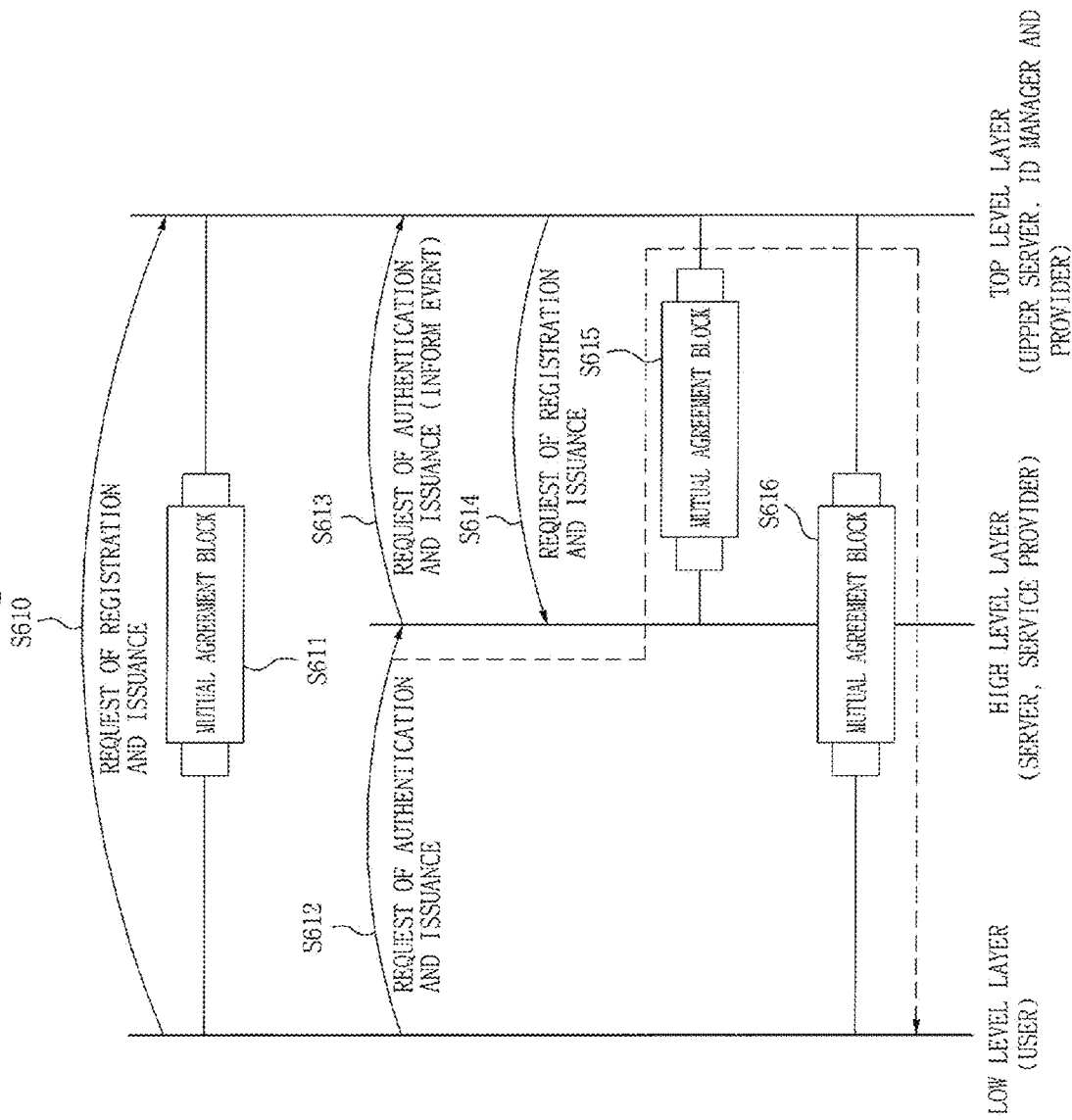

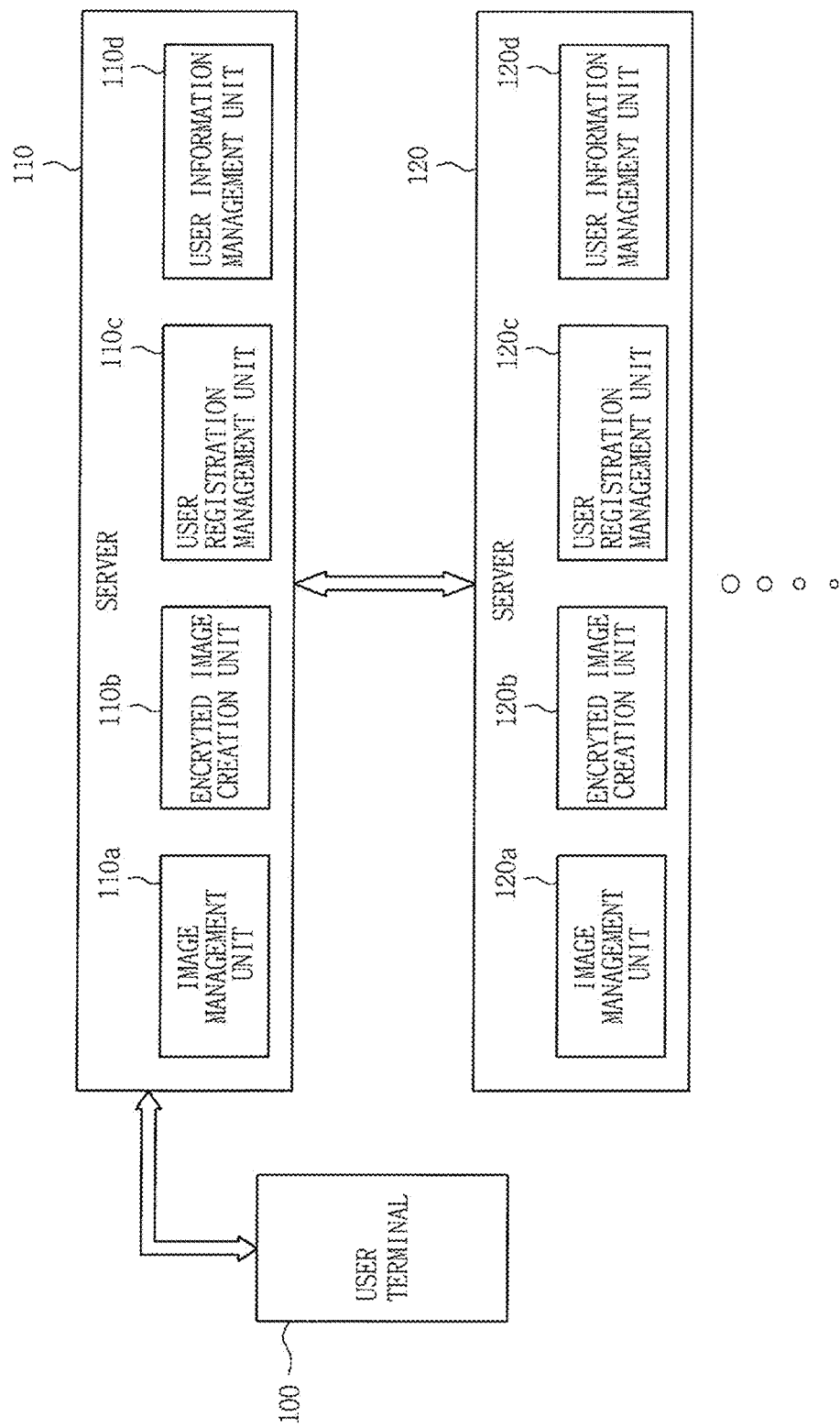

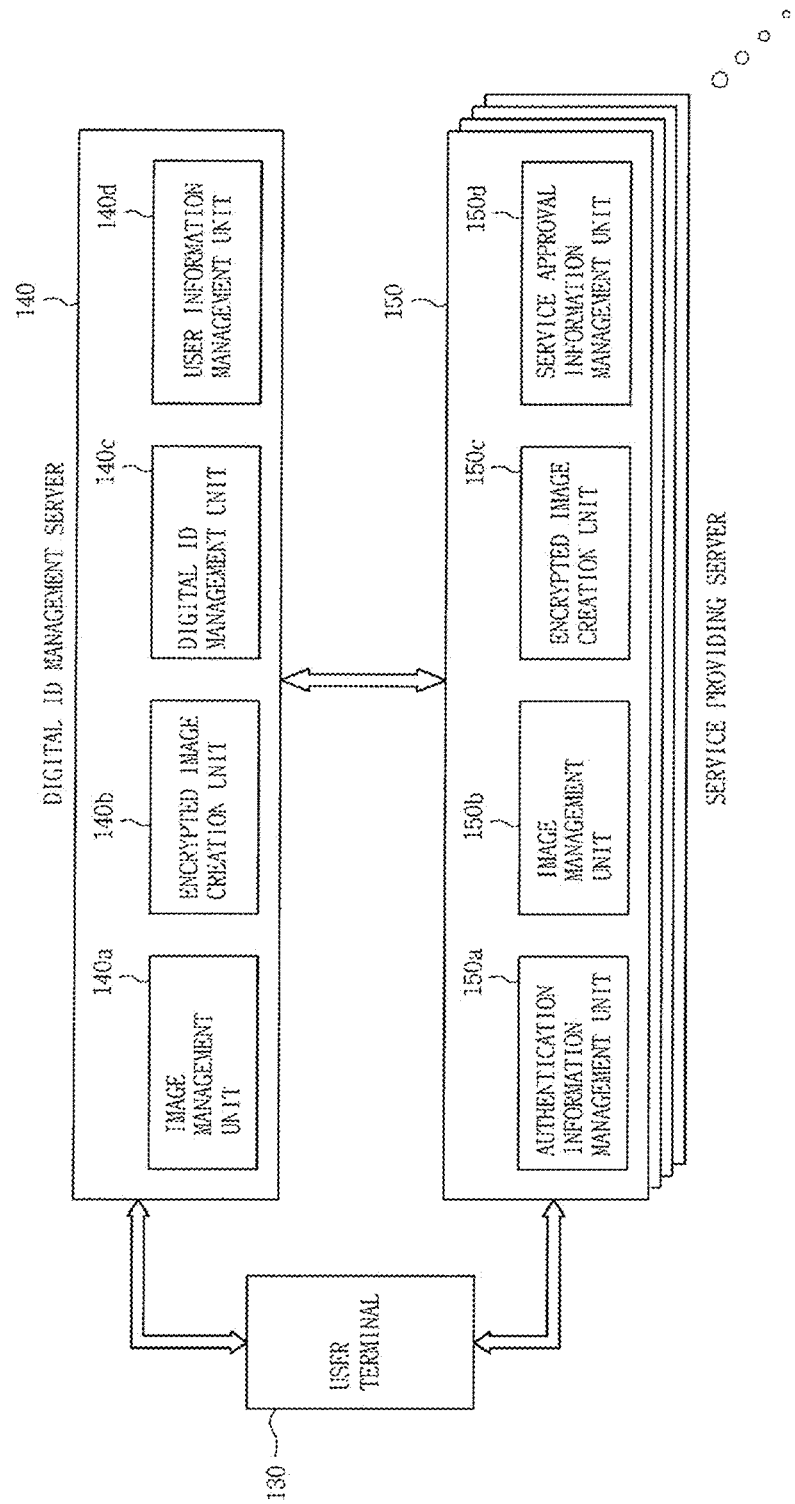

ENCRYPTED IMAGE WITH MATRYOSHKA STRUCTURE AND MUTUAL AGREEMENT AUTHENTICATION SYSTEM AND METHOD USING THE SAME

CROSS REFERENCE TO PRIOR APPLICATIONS

This application claims priority to Korean Patent Application No. 10-2008-0113957 (filed on Nov. 17, 2008), which is hereby incorporated by reference in its entirety.

BACKGROUND OF THE INVENTION

1. Field of the Invention

The present invention relates to an information management and mutual agreement authentication system using an encrypted image with a matryoshka structure, and more particularly to, an encrypted image with a matryoshka structure and a mutual agreement authentication system and method using the same, in which a plurality of other encrypted images is inserted into a specifically encrypted image to perform a sequential authentication procedure so as to prevent leakage of authentication information and immediately monitor the illegal use of the authentication information in real time.

2. Background of the Related Art

Recently, damages caused by an on-line ID theft are increasing along with the rapid change in a digital environment. As communications and financial transactions on-line are activated, a lot of monetary damages occur in reality.

As IP-based services are increasing, the importance of a digital identity (ID) management technology and system has been continuously raised due to the threats of ID theft, and to national security and main communication infrastructures and the like.

A technology which is spotlighted as a user-centric digital identity (ID) management technology is OpenID supported by the Liberty Alliance and CardSpace from Microsoft, and it is expected that interoperability between these two major identity (ID) management solutions, namely the Liberty Alliance and CardSpace will be gradually activated.

Currently, log-in information used in services and transactions on-line such as finances, stocks, on-line games, e-mails and the like includes of a user-ID and a password which are based on a text.

However, a text-based authentication structure is defenseless against damages caused by the ID theft through a hacking program (for example, keyboard hacking) automatically installed at a user computer upon the installation of software such as ACTIVE X and a virus-infected file and the like during the web surfing For example, as shown in FIG. 1, in the case where hacking program is installed, and a third party (hacker) unlawfully acquires a user's certificate and other information (user ID, password, certificate password, etc.) due to the user's carelessness, an existing digital ID management system cannot entirely protect the user's personal property. In addition, in the case where a financial accident occurs due to leakage of the user's certificate and other information to the hacker, when the user fails to report the damage caused by the financial accident to relevant authorities, a financial company also cannot correctly determine this damage situation. Further, it is difficult for a service provider to grasp and prevent a time point when a log-in information associated problem occurs.

Such a conventional authentication system used in services and transactions on-line has the following problems.

First, in case of a certificate, when an individual stores his or her certificate, the certificate is liable to be exposed to an illegal hacking.

Also, in the case where an unlawful user hacks a certificate stored by an individual and fraudulently uses it, the responsibility for the fraudulent use of the certificate is allocated to the individual, and thus there is very few countermeasure against the damages.

Moreover, in case of the conventional authentication system using a prior art certificate, it is difficult to immediately discern a service request by an unlawful user Besides, in case of an authentication system using a text-based user ID and password, the user ID and password is a simple combination of a variety of peripheral information such as a phone number, a birthday, and so forth, or is a simple modification, and thus is likely to be exposed to the keyboard hacking or phishing attacks.

Also, the use of the same user ID and password in a number of different websites makes leakage damages of personal information serious.

In addition, in the conventional authentication system, more enormous damage is caused by a large quantity of leakage of personal information at a service provider side than by leakage of personal information at an individual user side.

The large quantity of leakage of personal information at a service provider side may occur due to leakage of customer information by an insider, hacking of a personal information DB, and the like.

Furthermore, the digital ID management system is intended to provide centralized management of a user ID and a password at respective websites and convenience in use (aimed to reduce damage of different ID managements by each website) to a user.

However, the log-in information includes a personal website address superseding a user ID and a password, and a huger damage may be caused upon the leakage of personal information by hacking as compared a system requiring registration of an individual's personal information. Financial transactions associated with the digital ID management system may give a damage to personal property along with leakage of personal information.

SUMMARY OF THE INVENTION

Therefore, the present invention has been made in an effort to solve the problems involved in the prior art, and it is an object of the present invention to provide an encrypted image with a matryoshka structure and a mutual agreement authentication system and method using the same, in which a plurality of other encrypted images is inserted into a specifically encrypted image in a matryoshka doll fashion to perform a sequential authentication procedure so as to prevent leakage of authentication information and monitor the illegal use of the authentication information in real time.

Another object of the present invention is to provide an encrypted image with a matryoshka structure and a mutual agreement authentication system and method using the same, which can immediately determine whether or not there occurs a problem associated with a user's certificate and log-in information through the authentication management using the encrypted image with a matryoshka structure and a physical address of a user terminal.

Still another object of the present invention is to provide an encrypted image with a matryoshka structure and a mutual agreement authentication system and method using the same, which can immediately determine whether or not there occurs a problem associated with a user's certificate and log-in information through the authentication management using the encrypted image with a matryoshka structure and a user's biometric information.

Yet another object of the present invention is to provide an encrypted image with a matryoshka structure and a mutual agreement authentication system and method using the same, in which a user (lower level) personally performs the selection and sealing of a digital envelope image, and transmits the selected digital envelope image to an upper level server so as to enhance the effect of preventing hacking and phishing attacks as well as improve stability and efficiency of the update and re-issuance procedure.

A further object of the present invention is to provide an encrypted image with a matryoshka structure and a mutual agreement authentication system and method using the same, which can strengthen a security function related with a digital ID management system through the authentication management using the encrypted image with a matryoshka structure.

A still further object of the present invention is to provide an encrypted image with a matryoshka structure and a mutual agreement authentication system and method using the same, in which a user encrypts his or her own information personally in each layer in an authentication system having the matryoshka structure so that equalization of authority and responsibility can be realized in an interlayer authentication information management system.

To accomplish the above objects, according to one aspect of the present invention, there is provided an encrypted image with a matryoshka structure, and the encrypted image being used in authentication in an authentication system having a plurality of layers, the encrypted image including: a first encrypted image which can be opened by only a server of any one layer of the authentication system; and a second encrypted image which can be opened by only a server of another layer distinguished from the any one layer, wherein any one sealed encrypted image of the first and second encrypted images is embedded and sealed in the other encrypted image.

Preferably, only if respective authentication data extracted from the first and second encrypted images opened by the servers of the respective layers are all valid, a service authentication may be performed.

Also, preferably, the first and second encrypted images may be created by combining the authentication data by each layer and the respective images using a steganography technique.

In addition, preferably, the first encrypted image or the second encrypted image may be sealed while internally containing hardware information, biometric information, or a combination thereof of a server of a counterpart layer, but not its own layer.

Further, preferably, the first and second encrypted images may be sealed in their own layers, respectively.

To accomplish the above objects, according to another aspect of the present invention, there is provided a mutual agreement authentication method using an encrypted image with a matryoshka structure in registration and issuance of a digital ID of an authentication system having a plurality of layers, the method including a step of conducting a mutual agreement procedure to perform registration between any one of the plurality of layers and another layer according to a request of the any one of the plurality of layers, wherein the mutual agreement procedure includes the steps of: allowing the any one layer to provide identification information to the other layer according to a request of the identification information by the other layer; and when the other layer transmits an encrypted image in which the identification information is sealed and authentication data to the any one layer, allowing the any one layer to seal the sealed encrypted image and the authentication data of the other layer in an image of the any one layer through the a client.

Preferably, the mutual agreement procedure may further include a step of allowing the any one layer to transmit the image of the any one layer to the other layer so as to prevent phishing and validate authentication information upon re-issuance of the certificate.

Also, preferably, the step of allowing the other layer to seal the identification information in the encrypted image and the step of allowing the any one layer to seal the sealed encrypted image and the authentication data in the image thereof may further include a step of setting a password used in a subsequent encrypted image opening step.

Further, preferably, the identification information may include hardware information of the any one layer, the hardware information being a physical address of a storage medium of the any one layer in which dummy data transmitted to the any one layer from the other layer is written.

In addition, preferably; the encrypted image of the any one layer may be stored in the same storage area as the storage medium in which the dummy data has been written.

To accomplish the above objects, according to yet another aspect of the present invention, there is provided a mutual agreement authentication method using an encrypted image with a matryoshka structure in authentication of a digital ID of an authentication system having a plurality of layers, the method including a step of conducting a mutual agreement procedure to perform authentication between any one of the plurality of layers and another layer according to a request of the any one of the plurality of layers, wherein the mutual agreement procedure includes the steps of: allowing the any one layer to open an encrypted image thereof and extract authentication data from the opened encrypted image through a client; allowing the any one layer to transmit identification information and an encrypted image of the other layer to the other layer; and allowing the other layer to open a sealed encrypted image thereof and compare the identification information transmitted from the any one layer with the identification information which has been sealed in the encrypted image thereof so as to approve the authentication to the any one layer if it is determined that the identification information is valid.

Preferably, the identification information may include hardware information, biometric information or a combination thereof of the any one layer.

Also, preferably, the step of allowing the any one layer to open the encrypted image thereof and the step of allowing the other layer to open the sealed encrypted image thereof in the image thereof may further include a step of inputting a password set in a previous encrypted image sealing step.

To accomplish the above objects, according to still another aspect of the present invention, there is provided a mutual agreement authentication method using an encrypted image with a matryoshka structure in registration and issuance of a digital ID of an authentication system having a low level layer, a high level layer and a top level layer, the method including the steps of: allowing the high layer to request the registration and issuance of the digital ID from the top level layer; performing the mutual agreement procedure between the high level layer requesting the registration and issuance of the digital ID and the top level layer; allowing the low layer to request the registration and issuance of the digital ID from the high level layer; and performing the mutual agreement procedure between the low level layer requesting the registration and issuance of the digital ID and the high level layer.

To accomplish the above objects, according to a further aspect of the present invention, there is provided a mutual agreement authentication method using an encrypted image with a matryoshka structure in registration and issuance of a digital ID of an authentication system having a low level layer, a high level layer and a top level layer, the method including the steps of: allowing the low layer to directly request the registration and issuance of the digital ID from the top level layer; allowing top level layer to inform the high level layer that there is a request of the registration and issuance by the low level layer and allowing the high level layer to request the registration and issuance from the top level layer; performing the mutual agreement procedure between the high level layer requesting the registration and issuance and the top level layer; and performing the mutual agreement procedure between the high level layer and the low level layer.

To accomplish the above objects, according to a still further aspect of the present invention, there is provided a mutual agreement authentication method using an encrypted image with a matryoshka structure in registration and issuance of a digital ID of an authentication system having a low level layer, a high level layer and a top level layer, the method including the steps of: allowing the low layer to directly request the registration and issuance of the digital ID from the top level layer and performing the mutual agreement procedure between the low level layer requesting the registration and issuance and the top level layer; when the low level layer requests the registration and issuance of the digital ID from the high level layer, allowing the high level layer to request the registration and issuance of the digital ID from the top level layer; performing the mutual agreement procedure between the high level layer requesting the registration and issuance and the top level layer; and performing the mutual agreement procedure between the high level layer and the low level layer.

To accomplish the above objects, according to a yet further aspect of the present invention, there is provided a mutual agreement authentication method using an encrypted image with a matryoshka structure in registration and issuance of a digital ID of an authentication system having a low level layer, a high level layer and a top level layer, the method including the steps of: allowing the low layer to directly request the registration and issuance of the digital ID from the top level layer and performing the mutual agreement procedure between the low level layer requesting the registration and issuance and the top level layer; when the low level layer requests authentication and issuance of the digital ID from the high level layer, allowing the high level layer to inform the top level layer that there is a request of the authentication and issuance of the digital ID by the low level layer; allowing the top level layer to request the registration and issuance of the digital ID from the high level layer; performing the mutual agreement procedure between the top level layer requesting the registration and issuance and the high level layer; and performing the mutual agreement procedure between the top level layer and the low level layer for the update of the authentication information.

To accomplish the above objects, according to another further aspect of the present invention, there is provided a mutual agreement authentication method using an encrypted image with a matryoshka structure in authentication of a digital ID of an authentication system having a plurality of layers, the method including a step of conducting a mutual agreement procedure to perform authentication between any one of the plurality of layers and another layer according to a request of the any one of the plurality of layers, wherein the mutual agreement procedure comprises the steps of: allowing the any one layer to transmit identification information to the other layer according to a request of the identification information by the other layer; and when the other layer transmits an encrypted image in which the identification information is sealed and authentication data to the any one layer, allowing the any one layer to seal the sealed encrypted image and the authentication data in an image of the any one layer through a client.

Preferably, the identification information may include hardware information, biometric information or a combination thereof of the any one layer.

Also, preferably, only if respective authentication data extracted from the encrypted images opened by the servers of the respective layers are all valid, a service authentication may be performed.

In addition, preferably, the encrypted images of the respective layer may be created by combining the authentication data by each layer and the respective images using a steganography technique.

To accomplish the above objects, according to another yet further aspect of the present invention, there is provided a mutual agreement authentication system using an encrypted image with a matryoshka structure, the authentication system having a plurality of layers, wherein a server of any one of the plurality of layers includes: an image management unit for managing an image for encryption; an encrypted image creation unit for creating an encrypted image of the server, and embedding and sealing the encrypted image of the server in an encrypted image of a server of another layer of the plurality of layers; and a user information management unit for managing hardware information of the server of the other layer in which dummy data is written upon the request of issuance of a certificate by the server of the other layer, or receiving and managing the biometric information from the server of the other layer.

To accomplish the above objects, according to another still further aspect of the present invention, there is provided a mutual agreement authentication system using an encrypted image with a matryoshka structure, the authentication system having a hierarchical structure of a user, a digital ID management server and a service providing server, wherein the digital ID management server include: an encrypted image creation unit for sealing a digital ID management image upon the request of a service using the user's digital ID; and a digital ID management unit for managing information on digital ID registration, and wherein the service providing server includes: an authentication information management unit for managing authentication information using a digital ID; an image management unit for managing a service provider's image; an encrypted image creation unit for sealing the authentication information provided from the digital ID management server in the service provider's image; and a service approval information management unit for managing approval information for provision of the service by a digital ID issuance and authentication procedure using the encrypted image with a matryoshka structure.

BRIEF DESCRIPTION OF THE DRAWINGS

The above and other objects, features and advantages of the present invention will be apparent from the following detailed description of the preferred embodiments of the invention in conjunction with the accompanying drawings, in which:

FIG. 3b is a view illustrating a mutual agreement block (opening) between layers in an authentication system using an encrypted image with a matryoshka structure according to the present invention;

FIG. 4a is a flowchart illustrating a registration and issuance procedure of a digital ID using an encrypted image according to a first embodiment of the present invention;

FIG. 4b is a flowchart illustrating a registration and issuance procedure of a digital ID using an encrypted image according to a second embodiment of the present invention;

FIG. 6a is a flowchart illustrating a registration and issuance procedure of a digital ID using an encrypted image according to a third embodiment of the present invention;

FIG. 6b is a flowchart illustrating a registration and issuance procedure of a digital ID using an encrypted image according to a fourth embodiment of the present invention;

FIG. 8 is a block diagram illustrating the construction of an interlayer authentication system using an encrypted image with a matryoshka structure according to an embodiment of the present invention; and FIG. 9 is a block diagram illustrating the construction of a digital ID issuance and authentication system using an encrypted image with a matryoshka structure according to another embodiment of the present invention.

DETAILED DESCRIPTION OF THE PREFERRED EMBODIMENT

The preferred embodiments of an encrypted image with a matryoshka structure and a mutual agreement authentication system and method using the same according to the present invention will be described in detail with reference to the accompanying drawings.

The features and advantages of an encrypted image with a matryoshka structure and a mutual agreement authentication system and method using the same according to the present invention will be apparent from the detailed descriptions of the embodiments described below.

Figure 1:
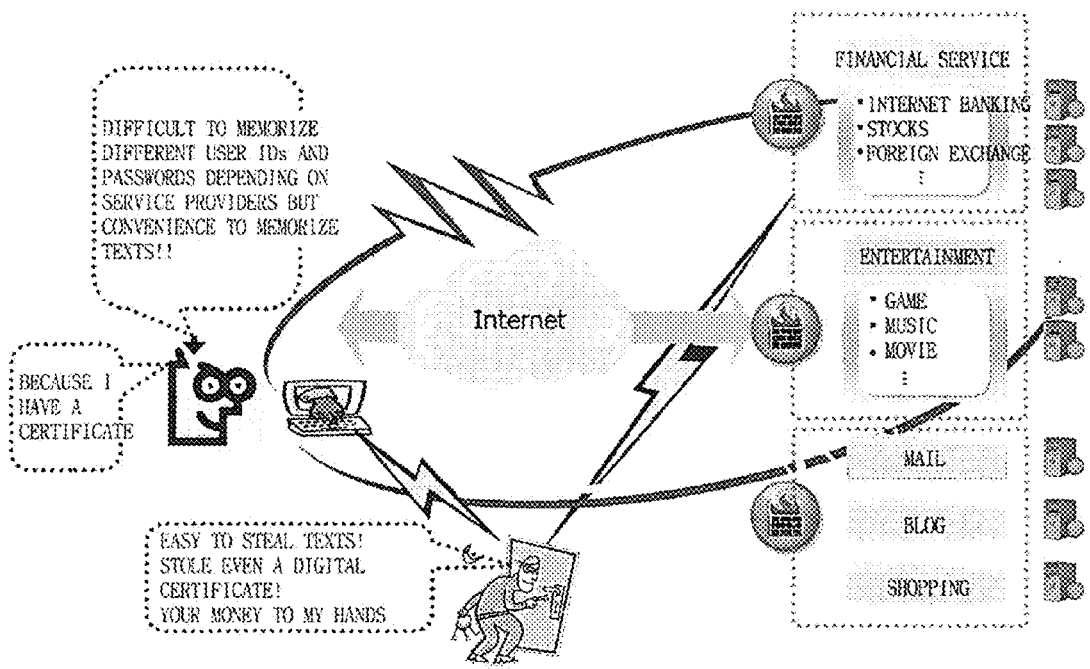
FIG. 1 is a block diagram illustrating the construction of a conventional text-based authentication system according to the prior art.
Figure 2A:
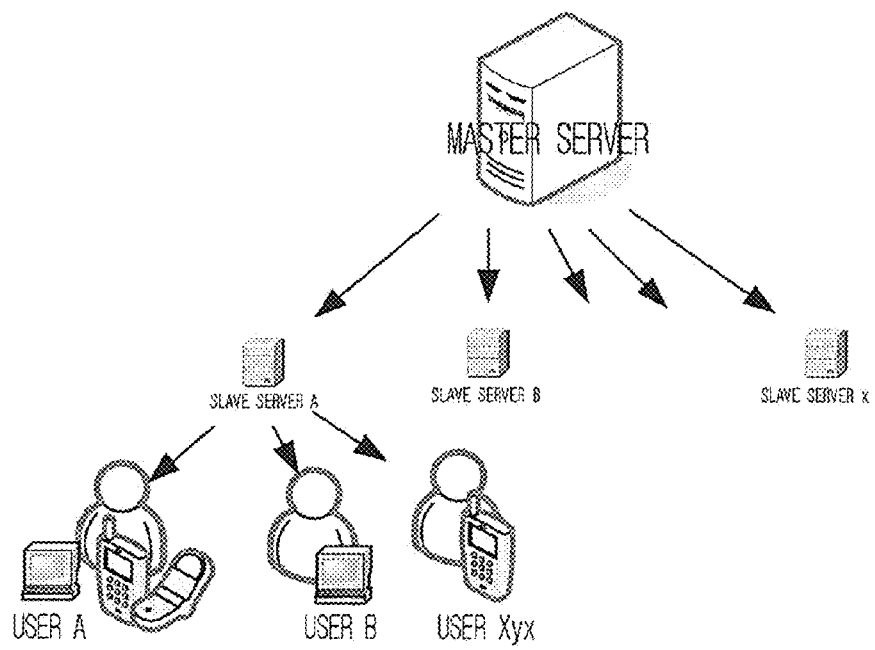
FIGS. 2a and 2b are diagrammatic views illustrating an authentication system using an encrypted image with a matryoshka structure and the encrypted image.
Figure 2B:
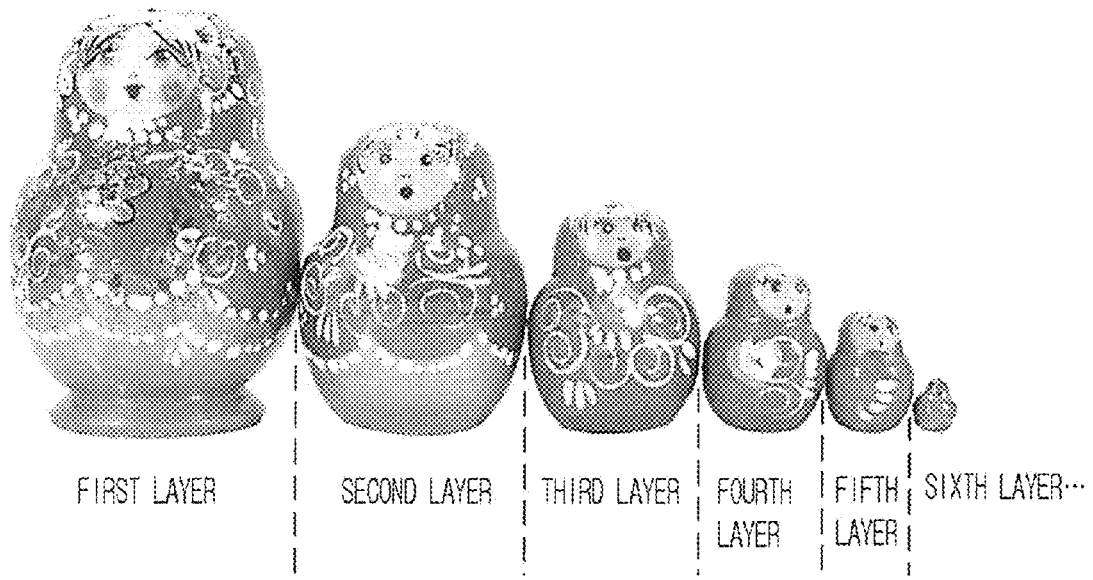

FIGS. 2a and 2b are diagrammatic views illustrating an authentication system using an encrypted image with a matryoshka structure and the encrypted image.

The present invention strengthens an authentication management and system security function using an encrypted image with a matryoshka structure upon the transmission of data necessary for authentication between users, servers and an upper server.

The term "matryoshka structure" as defined herein refers to limitation of an authority to extract and recognize data contained in an encrypted image transmitted from each user, each server and each upper server (low level layer, high level layer, top level layer).

That is, in the present invention, an encrypted image with a "matryoshka structure" is configured such that another encrypted image is embedded and sealed in a specifically encrypted image, another encrypted image is embedded and sealed in the other encrypted image, and extraction (opening) of data from the resultantly sealed encrypted image is performed by each layer.

In addition, the term "client" as defined herein generally refers to software provided to a slave server or a user terminal from a master server. This is a program allowing a user to perform a variety of functions such as acquisition of a digital certificate, creation of a sealed encrypted image, transmission of a user selection image, etc.

An encrypted image with a matryoshka structure according to the present invention includes a first encrypted image which can be opened by only a server of any one layer of an authentication system having a plurality of layers, and a second encrypted image which can be opened by only a server of another layer distinguished from the any one layer. The encrypted image with a matryoshka structure is configured such that any one sealed encrypted image of the first and second encrypted images is embedded and sealed in the other encrypted image.

Like this, the construction in which one encrypted image is embedded in the other encrypted image may be repeatedly implemented according to the number of the layers as shown in FIG. 2b.

A user's encrypted image is an encrypted image which can be opened by a user. A server image for a primary service provider, which cannot be opened by the user and is encrypted, exists in this encrypted user image.

If there exists an upper service provider (i.e., secondary service provider) managing the first service provider, the encrypted server image is similarly configured of an upper server image which cannot be decrypted by a person who opens it. Each time a layer is additionally provided, the encrypted server image may be configured in the same manner as described above.

Thus, in the case where the authentication system is constructed as shown in FIG. 2a, data necessary for authentication are sealed in an encrypted image in each user, each slave server and a master server. In this case, it is impossible to grasp extraction of data contained in the encrypted image as well as the fact itself that the data is contained in the encrypted image except a given authority in the each user, the each slave server and the master server.

It is, of course, to be noted that the transmission and storage of data using such an encrypted image with a matryoshka structure can be used for transmission of authentication data as well as personal information after authentication.

In the case where the authentication system includes users, slave servers and a master server, the encrypted image with a matryoshka structure according to the present invention is configured such that authentication associated data having each limited authority for provision of a service are sealed in an encrypted image of each layer.

That is, a user's encrypted image in which authentication data for the user is sealed, a slave server's encrypted image in which authentication data for the slave servers is sealed, and a master server's encrypted image in which authentication data for the master server is sealed are constructed, and each authentication associated data is sealed in its own encrypted image and is transmitted.

In order for a user to receive a service through the slave server and the master server, the user must extract authentication data for the user from the user's sealed encrypted image and should undergo an authentication procedure using the extracted authentication data.

In such an authentication procedure, the slave server and the master server must extract their own authentication data from their sealed encrypted images, respectively, and the user, the slave server and the master server all must perform the extraction of the authentication data. If the extracted authentication data are all valid, a service which the user wishes to receive is performed.

Accordingly, even if an unlawful user hacks a sealed encrypted image which a user stores, since extraction of the authentication data from the sealed encrypted image must be performed hierarchically, the illegal use of the authentication data is basically inhibited.

The authentication system using such an encrypted image of a hierarchical structure can inhibit the illegal use of an encrypted image which a user stores as well as the illicit use of the encrypted image by the slave server and the master server in a certificate issuance process.

For example, even if large quantities of data are hacked in the slave server or the master server so that the encrypted images of a plurality of users are leaked, since authentication data must be hierarchically extracted from the leaked sealed encrypted images, it is difficult for a hacker to know the encrypted images designated at each step, thereby inhibiting the illegal use of authentication data.

Here, the process of hierarchically extracting authentication data from the sealed encrypted image includes a step of confirming hardware information and the biometric information of a counterpart layer so that the extraction of the authentication data is prevented.

The sealed encrypted image creating technology applied to authentication using the encrypted image with a matryoshka structure according to the present invention employs a steganography technique.

A well-known example of such a steganography tool includes F5 developed in the Germany, secure engine configured in such a fashion that a text is hidden in a larger text, MP3 stego which embeds a secret message in an MP3 file, etc.

As an example of a method of creating the sealed encrypted image, U.S. Pat. No. 6,697,498 B2 (issued on Feb. 24, 2004) entitled ┌Method and Computer Program Product for Hinding Information in an Indexed Color Image┘ may be adopted.

However, the embodiments of the present invention are not limited to the above method, but include all the embodiments which can be embodied by a person having an ordinary skill in the art to which the present invention pertains using the steganography technique.

A steganography method of hiding data in a digital picture file is in more detail described in ┌Steganalysis of JPEG Images: Breaking the F5 Algorithm┘ [ISSN 0302-9743 (Print) 1611-3349 (Online) Volume 2578/2003], which is obvious to those skilled in the art, and thus its detained description will be omitted to avoid redundancy.

An authentication procedure using the encrypted image of a hierarchical structure according to the present invention will be described in detail hereinafter.

The present invention proposes a method of using "user hardware information using dummy data and a method a method of using "user biometric information" in order to further strength the hierarchical management of the sealed encrypted image.

Of course, it is natural that the authentication procedure can be performed by applying the methods of using the user hardware information and the user biometric information to the hierarchical management of the sealed encrypted image.

Here, when dummy data is recorded in a server of a counterpart layer and hardware information of the server of the counterpart layer in which the dummy data is recorded is acquired, hardware information of a counterpart server requesting authentication is compared with the acquired hardware information to determine whether or not the use of the hardware information is valid in a later authentication process.

Also, when the biometric information is acquired, biometric information of a counterpart server requesting the authentication is compared with the acquired biometric information to determine whether or not the use of the biometric information is valid in a later authentication process.

In other words, the biometric information (physiological characteristics: face images, fingerprints, irises, etc./behavioral characteristics: voices, handwritings, etc.) is requested, data for this biometric information is encrypted to create an encrypted image, and the created encrypted image can be sealed in a user's encrypted image.

If large quantities of data are contained in the biometric information, only the characteristics (template) of the biometric information may be transmitted to the server for encryption.

Each of the method of using the hardware information and the method of using the biometric information may be one solution depending on the operational environment of a user and a server, and the both methods may be all employed.

For example, a user's sealed encrypted image may be created by acquiring fingerprint and iris information of a user in an environment requiring a special security such as an electronic passport (or e-passport) and by acquiring the characteristics of a face image of the user on-line, or a server may request and seal the information in a process of combining the hardware (H/W) information and the biometric information.

A biometric identification technology is a technology which authenticates/confirms identity of a person through an automated device using the physiological characteristics (fingerprints, irises, etc.) or the behavioral characteristics (voices, handwritings, etc.) of the person.

A biometric identification system which is can be applied to the present invention has the following principles.

First, raw biometric information is examined by using a fingerprint recognition sensor and the like.

Second, characteristic information (template) is extracted and digitalized from the raw biometric information, and the digitalized characteristic information is calculated.

Third, reference information containing first template information is registered in the system.

Fourth, biometric information re-extracted from the user is compared with reference information and it is determined whether or not the both information match each other.

In the foregoing, the term "template" refers to a mathematical model calculated using several characteristic points from raw biometric information (raw material) inputted from a sensor. For example, the template is a numeral value of a combination of extracted feature points such as a start point, an end point, a central point and the like of a ridge line of in a picked fingerprint.

A method of providing biometric information according a request of the biometric information by a counterpart layer may be performed in such a fashion that a user connects a digital information storage medium such as a USB memory, a smart card or the like, which stores the biometric information to a server of the counterpart layer to provide the biometric information to the counterpart server.

Here, upon the provision of the biometric information, user information is not always provided from a relevant server in real time, but it is possible to apply a USB hard lock concept.

The present invention performs a procedure by a "mutual agreement block" between respective layers in order to select an encrypted image and seal authentication data in the selected encrypted image in each layer for the purpose of the hierarchical management of the encrypted image.

The hierarchical management of the encrypted image will be described hereinafter in detail with reference to FIG. 2a.

In a user A, a slave server A and a master server, an encrypted image of an end user A can be opened by the end user, and it is impossible for the end user to access an opening password of an encrypted image of the slave server A embedded in the opened encrypted image of the end user A. Only a person having an authority of the slave server A can gain access to the opening password of an encrypted image of the slave server A.

Further, if a master server is in a top level layer, an encrypted image of the master server embedded in the slave server A cannot be opened and only a person having an authority of the master server can decrypt the encrypted image of the master server.

If encrypted storage media which can be used by the user A are a PC, a cellular phone and a smart phone, three encrypted images can be created and used. Also, the hardware information of the storage media is sealed in an encrypted image of the slave server A.

That is, in order for the slave server A to manage the encrypted image of the user A, the slave server A must know a storage place of the encrypted image of the user A, other information and the like so as to prevent the illegal copy and use of authentication information.

In addition, if the user A requires the encrypted images as many as the number of the storage media, he or she obtains permission to use the encrypted images from the slave server A through confirmation.

In the encrypted image of the slave server A, is recorded the information which can grasp the physical information of a file of a medium where the encrypted image of the user A is stored in a file system of the storage media stored by the user A, for example, volume information, an image size and a physical address (cluster information, the number of FAT entries per sector, etc.) of HDD in case of a FAT32 file system. Also, substantial and immobile physical factors related with Inode are embedded in the encrypted image of the slave server A in case of a Unix or Linux file system.

This recorded information can vary depending on the file system. If the storage medium is provided in plural numbers, a plurality of information is recorded in the encrypted image of the slave server A.

In the case where the encrypted image of the user A is not limited to the storage medium, but is used by being downloaded on-line, electronic information (personal information containing various records) such as a digital signature is recorded and sealed in the encrypted image.

A mutual agreement process between layers in an authentication and registration procedure using an encrypted image with a matryoshka structure according to the present invention will be described hereinafter.

Figure 3A:
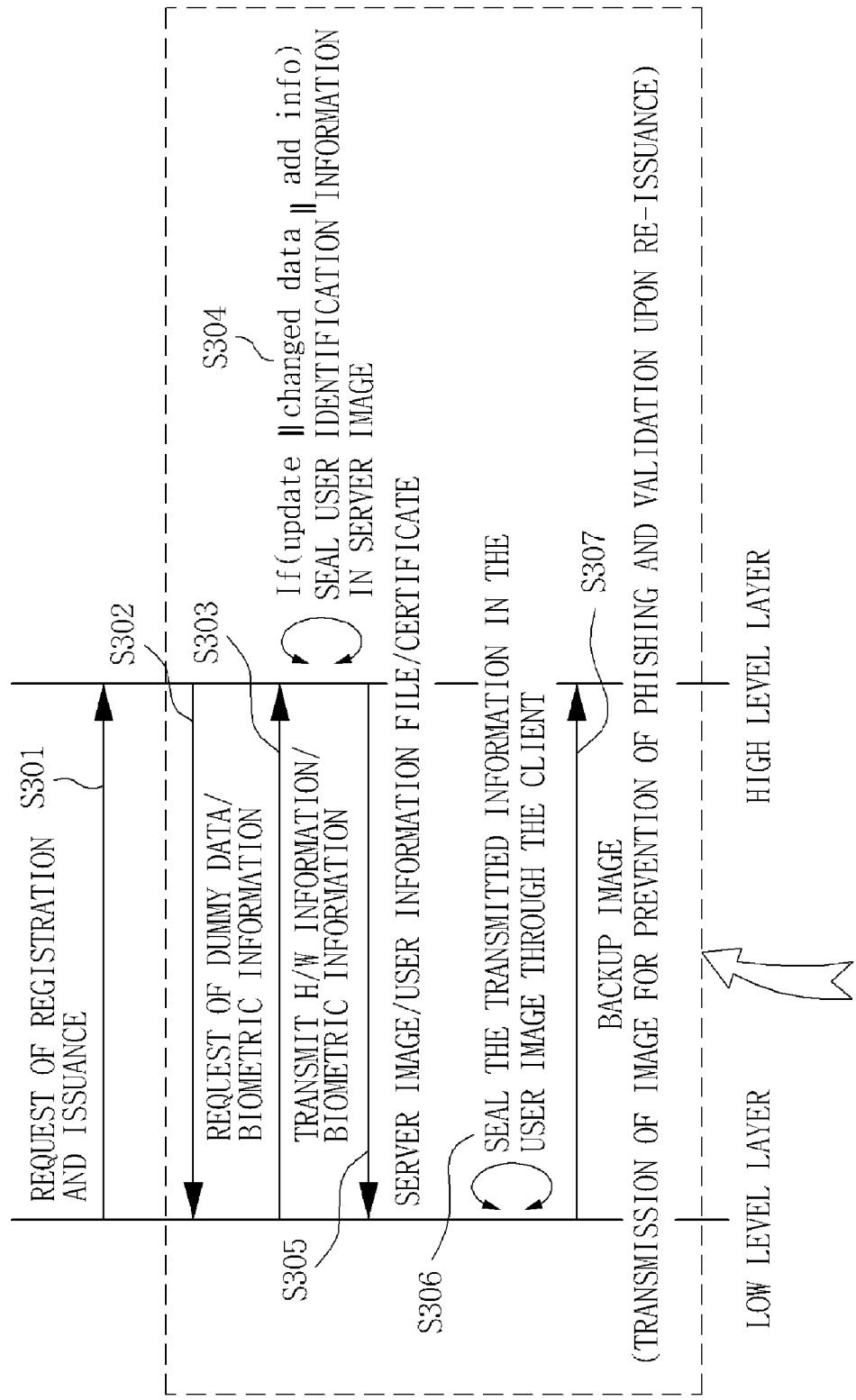
FIG. 3a is a view illustrating a mutual agreement block (sealing) between layers in an authentication system using an encrypted image with a matryoshka structure according to the present invention.

FIG. 3a is a view illustrating a mutual agreement block (sealing) between layers in an authentication system using an encrypted image with a matryoshka structure according to the present invention, and FIG. 3b is a view illustrating a mutual agreement block (opening) between layers in an authentication system using an encrypted image with a matryoshka structure according to the present invention.

Figure 3C:
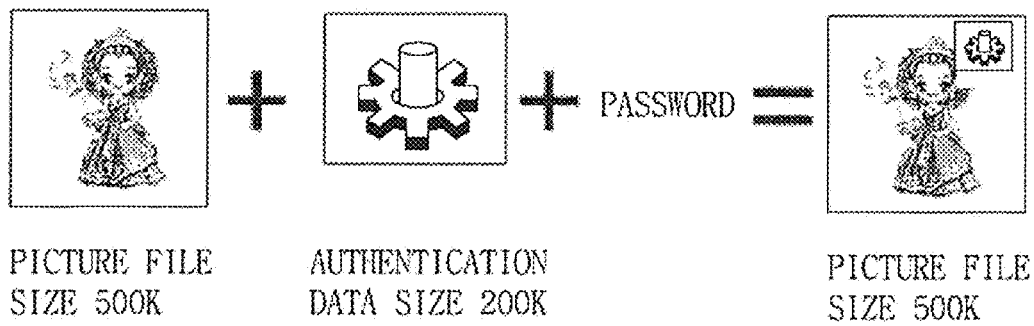
FIGS. 3c and 3d are diagrammatic views illustrating the sealing and opening processes of an encrypted image according to the present invention.
Figure 3D:
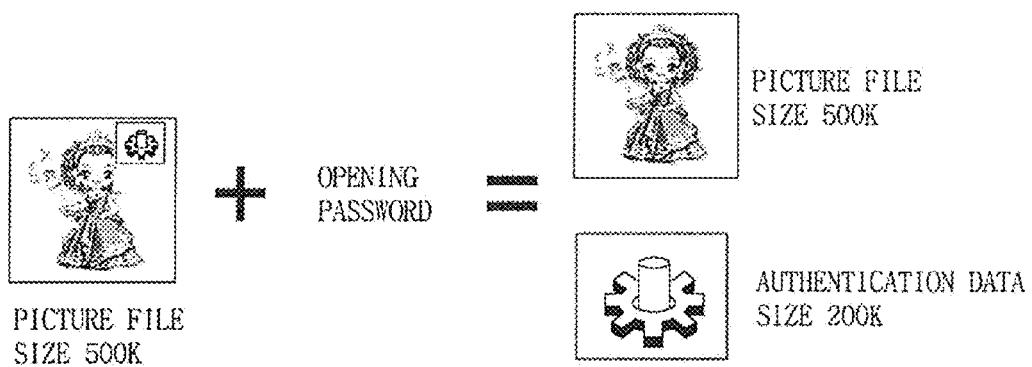

FIGS. 3c and 3d are diagrammatic views illustrating the sealing and opening processes of an encrypted image according to the present invention.

Now, a mutual agreement block for the sealing of an encrypted image with a matryoshka structure will be described hereinafter with reference to FIG. 3a.

First, when a low level layer requests authentication and registration from a high level layer (S301), the high level layer transmits a signal requesting dummy data or a user's biometric information to the low level layer (S302).

Here, the transmission of the dummy data requesting signal is intended to acquire hardware information of the low level layer to enhance security, and the transmission of the user's biometric information requesting signal is also intended to enhance security.

It is, of course, to be noted that a method of using user's hardware information and biometric information may be applied to the hierarchical management of the sealed encrypted image to perform the authentication procedure.

Subsequently, the low level layer transmits the user's hardware information or biometric information to the high level layer (303), the high level layer seals user identification information in a server image (S304).

Then, the high level layer transmits the server image in which the user identification information is sealed and authentication data to the low level layer (S305), the low level layer seals information transmitted from the high level layer in an user image (image selected in the low level layer) through a client (S306).

Here, the sealed user image is stored in the same memory area as a memory area where the dummy data is written upon the acquisition of the hardware information.

As such, when the sealing process is completed, the low level layer transmits the image of the low level layer to the high level layer (S307).

The transmission of the image of the low level layer at step S307 is intended to prevent phishing and validate authentication information upon re-issuance of the certificate, and may be performed selectively.

Such a performance process of the mutual agreement block is intended to increase the agreement between layers in authentication data management and enhance security in authentication system using an encrypted image with a matryoshka structure.

In addition, the sealing of the authentication data by the low level layer through the client has a concealing effect for storage of information transmitted to the low level layer from the high level layer. Also, validation data upon user identification, issuance and re-issuance of the certificate is secured by the transmission of the image of the low level layer to the high level layer.

In particular, emphasis is not given to only the high level layer, but equal emphasis can be given to the high level layer and the low level layer in the management of the authentication data as well as the low level layer possesses security independently by the sealing of the authentication data by the low level layer through the client.

Moreover, upon the transmission of data to the low level layer from the high level layer, security is increased by the use of the server image in which the user identification information is sealed.

Next, a mutual agreement block for the opening of an encrypted image with a matryoshka structure will be described hereinafter with reference to FIG. 3b.

First, when the low level layer requests authentication from the high level layer (S311), the client is driven to release the sealing of the user's encrypted image (S312).

Subsequently, the low level layer transmits hardware information, biometric information and an encrypted image of a server of the high level layer which has been sealed in the user image to the high level layer (S313).

When the hardware information and the biometric information is transmitted to the high level layer from the low level layer (S313), the high level layer opens the server's encrypted image thereof and compares the hardware information and the biometric information which have been sealed in the server's encrypted image with the hardware information and the biometric information transmitted to the high level layer from the low level layer so as to determine whether or not the user is valid (S314).

If it is determined that the user is valid, the high level layer approves the authentication to the low level layer (S315).

In the mutual agreement process for the registration/issuance and authentication, it is also possible to include a step of setting and inputting a password upon the sealing and the opening of the encrypted image as shown in FIGS. 3c and 3d.

The password may be set by using a character, biometric information or the like, and may be set by using a combination thereof.

The setting of the password to open the encrypted image by identification of the biometric information is performed by conducting a biometric information registering process including the registration of user face image template information, a fingerprint, an iris and the like.

Now, the embodiments of the authentication using an encrypted image with a matryoshka structure according to the present invention will be described hereinafter in detail.

Embodiment 1

FIG. 4a is a flowchart illustrating a registration and issuance procedure of a digital ID using an encrypted image according to a first embodiment of the present invention.

FIG. 4a shows a registration and issuance process in a state in which an intermediate layer (high level layer) gets an authorization from a top level layer.

This registration and issuance process has a structure in which a service request is performed between a user/a final certificate authority and a service provider without any contact between the final certificate authority and the user.

For example, a high level layer (server, service provider) of a bank, an insurance company branch office and the like requests registration and issuance from a top level layer (upper server, ID manager and provider) such as Korea Financial Telecommunications and Cleanings Institute (KFTCI), bank server, an insurance company server and the like (S401).

The mutual agreement procedure between the high level layer and the top level layer is performed by the registration and issuance (S402).

The interlayer mutual agreement procedure is performed as shown in FIG. 3a. When the mutual agreement procedure is performed, the top level layer provides a service to the high level layer (S403).

In this state, when the low level layer (user) requests registration and issuance from the high level layer (S404), then the mutual agreement procedure between the high level layer and the low level layer is performed (S405).

In this case, the interlayer mutual agreement procedure is performed as shown in FIG. 3a. When the mutual agreement procedure is performed, the high level layer provides a service to the low level layer (S406).

The registration and issuance procedure using the encrypted image of FIG. 4a shows a registration and issuance procedure in an authentication system having a structure in which the registration information of the low level layer (user) must be always managed by the top level layer.

Embodiment 2

FIG. 4b is a flowchart illustrating a registration and issuance procedure of a digital ID using an encrypted image according to a second embodiment of the present invention.

FIG. 4b shows a registration and issuance procedure in an authentication system having a structure in which the registration and issuance procedure is performed stepwisely from the top level layer and a use place and a registration place of the authentication content are different from each other.

Here, authentication by the low level layer is related with a driver's license, a resident registration card, a passport and a medical insurance card, and the high level layer is a police station, a village office, an immigration office, a hospital, a drugstore or the like.

Also, the top level layer is a license issuance authority, a ward office, the Ministry of Justice, the Ministry of Health and Welfare, or the like.

First, the low level layer (user) directly requests registration and issuance from the top level layer (S411).

Then, the top level layer informs the high level layer that there is a request of the registration and issuance by the user (S412).

Next, the high level layer requests the registration and issuance from the top level layer (S413).

The mutual agreement procedure between the high level layer and the top level layer is performed by the request of the registration and issuance (S414).

The interlayer mutual agreement procedure is performed as shown in FIG. 3a, and the mutual agreement procedure between the high level layer and the low level layer is performed after the mutual agreement procedure has been performed (S415).

The authentication procedure using the encrypted image of FIG. 4b shows a registration and issuance procedure in the case where which the registration information of the low level layer must be always managed by the top level layer, or a user directly performs the registration from the top level layer like open ID and digital ID.

Now, the issuance, registration and authentication of a digital ID using an encrypted image with a matryoshka structure will be described hereinafter.

Figure 5:
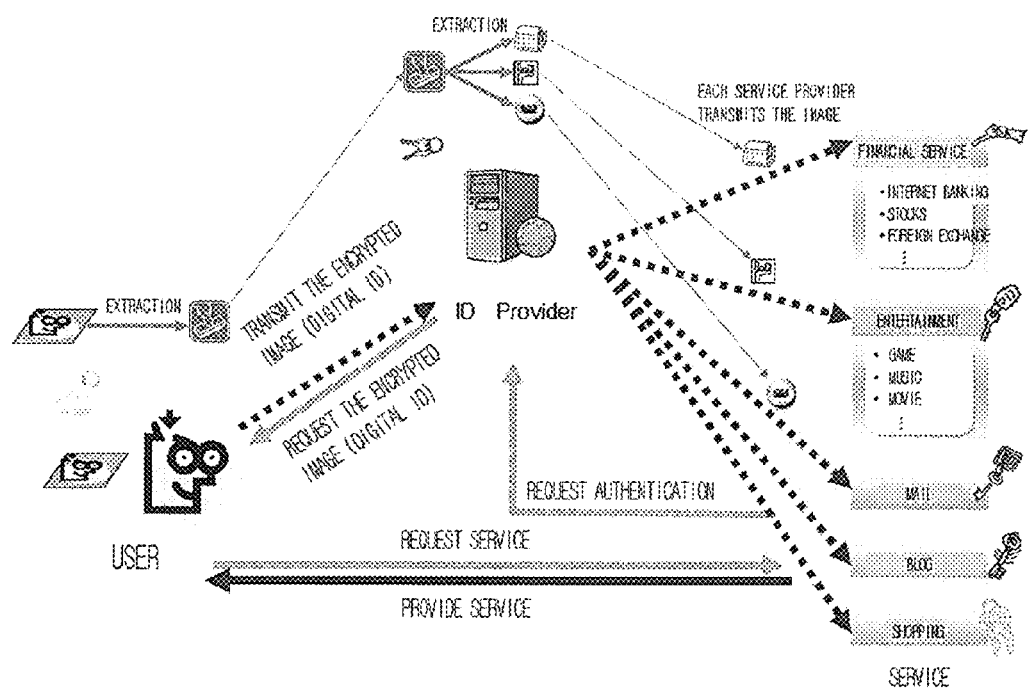
FIG. 5 is a detailed block diagram illustrating the construction of an authentication system using an encrypted image with a matryoshka structure according to the present invention.

FIG. 5 is a detailed block diagram illustrating the construction of an authentication system using an encrypted image with a matryoshka structure according to the present invention.

In a current authentication system, the management of a certificate and the service use procedure is complex, and user IDs and passwords by each website are different from each other. Thus, personal information must be provided by each website, and the user must memorize user IDs and passwords for all the websites.

Therefore, the interest is increasing in a digital ID issued through a certificate authority, which enables a user to join in a number of websites to integrate the authentication procedure.

However, a current digital ID management system strengthens a security function to reduce a damage caused by hacking and phishing attacks, but is not in a level to monitor the illegal use of the digital ID in real time.

That is, the current digital ID management system is not in a level in which a digital ID provider can get trust from the users, but hardly have a countermeasure against leakage of the personal information by an outsider and an insider.

Thus, the present invention provides a novel digital ID management system which can monitor security problem and illegal use in real time, and can operate the system as an independent structure without entirely depending on the digital ID provider through the authentication management using an encrypted image with a matryoshka structure.

Embodiment 3

FIG. 6a is a flowchart illustrating a registration and issuance procedure of a digital ID using an encrypted image according to a third embodiment of the present invention.

FIG. 6a shows a process in which the mutual agreement procedure between the low level layer (user) and the top level layer is first performed, and then the registration and issuance procedure between the low level layer (user)/the top level layer and a service provider is performed.

This process can be applied to the case where the user newly adds a service provider in a state in which the mutual agreement procedure between the user and the top level layer has been performed to conduct the registration and issuance of the digital ID. This process adopts a structure in which an encrypted image of the top level layer is embedded in an encrypted image of the high level layer, and the high level layer cannot open the encrypted image of the top level layer and extract authentication information from the opened encrypted image.

Thus, the high level layer transmits information for service registration to the top level layer so that a service can be provided.

Here, the low level layer is a user, the high level layer is a service provider, and the top level layer is an ID manager and provider.

First, the low level layer requests a registration and issuance from the top level layer (S600), the mutual agreement procedure between the low level layer (user) and the top level layer is performed (S601).

Similarly, the mutual agreement procedure is performed as shown in FIG. 3a.

In this state, the low level layer requests a registration and issuance from the high level layer (S602), and the high level layer requests a registration and issuance from the top level layer (S603).

Next, the top level layer receives the request of the registration and issuance from the high level layer, and then performs the mutual agreement procedure with the high level layer (S604).

Subsequently, the mutual agreement procedure between the high level layer and the low level layer is performed (S605).

Here, the mutual agreement procedures are performed as shown in FIG. 3a.

Such a structure shows a process in which the mutual agreement procedure between the low level layer (user) and the top level layer, and then the registration and issuance procedure between the low level layer (user)/the top level layer and the service provider is performed.

Embodiment 4

FIG. 6b is a flowchart illustrating a registration and issuance procedure of a digital ID using an encrypted image according to a fourth embodiment of the present invention.

FIG. 6b shows a structure in which the registration and issuance procedure of a digital ID is always, performed via the top level layer. That is, the management of the registration and issuance procedure of the digital ID is not perform in the order of the top level layer, the high level layer and the low level layer, but is formed in the order of the high level layer, the top level layer and the low level layer.

This registration and issuance procedure adopts a structure in which the top level layer acts as the service provider providing an actual service.

Here, the low level layer is a user, the high level layer is a service provider, and the top level layer is an ID manager and provider.

First, when the low level layer requests a registration and issuance of a digital ID from the top level layer (S610), the mutual agreement procedure between the low level layer (user) and the top level layer is performed (S611).

Similarly, the mutual agreement procedure is performed as shown in FIG. 3a.

In this state, when the low level layer requests authentication and issuance from the high level layer (S612), the high level layer requests a service (informs an event) from the top level layer (S613).

Next, the top level layer receives the request of the service from the high level layer, and then requests registration and issuance from the high level layer (S614).

Subsequently, the mutual agreement procedure between the high level layer and the top level layer for the request of the registration and issuance is performed (S615).

When the mutual agreement procedure between the high level layer and the top level layer is performed, the mutual agreement procedure between the low level layer and the top level layer for the update of authentication information is performed (S616).

Here, the update of authentication information means that the low level layer receives the registration information added with information of the high level layer from the top level layer.

The above steps are performed each time the user request a service from a service provider using a digital ID. In the case where the service provider which the user joined exits in plural numbers, an image of a digital ID management company is sealed in a user's image, and encrypted images of a plurality of service providers is sealed therein.

The digital ID management system according to the present invention can monitor security problem and illegal use in real time, and can operate the system as an independent structure without entirely depending on the digital ID provider through the authentication management using an encrypted image with a matryoshka structure.

The above-mentioned first to fourth embodiments illustrate the service registration and issuance by each layer and adopt the mutual agreement procedure as shown in FIG. 3a. However, above-mentioned first to fourth embodiments adopt the mutual agreement procedure as shown in FIG. 3b in the authentication procedure. In this case, it is natural that a part of the procedures of FIGS. 4a, 4b, 6a and 6b may vary.

Now, the detailed construction of the authentication system using an encrypted image with a matryoshka structure will be described hereinafter.

Figure 7:
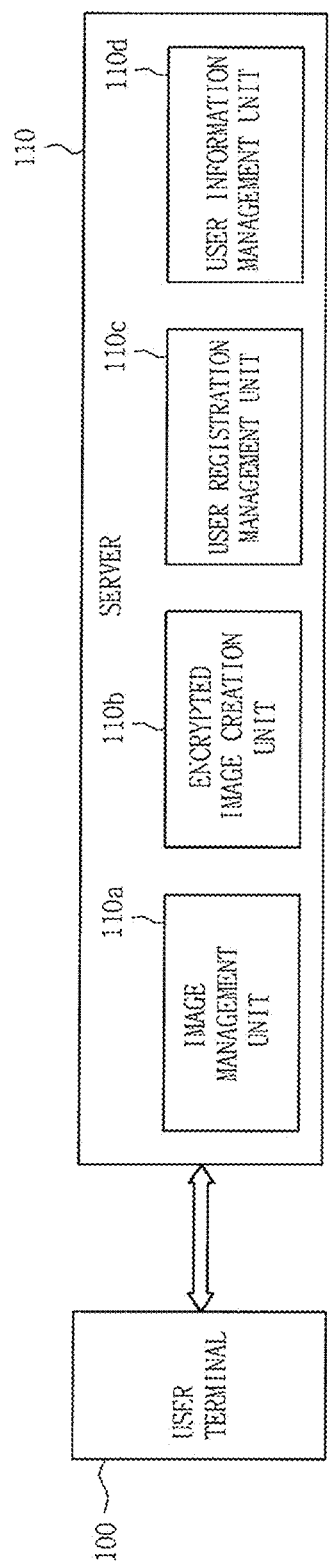
FIG. 7 is a block diagram illustrating the construction of an authentication system using an encrypted image with a matryoshka structure according to an embodiment of the present invention.

FIG. 7 is a block diagram illustrating the construction of an authentication system using an encrypted image with a matryoshka structure according to an embodiment of the present invention.

FIG. 8 is a block diagram illustrating the construction of an interlayer authentication system using an encrypted image with a matryoshka structure according to an embodiment of the present invention.

FIG. 9 is a block diagram illustrating the construction of a digital ID issuance and authentication system using an encrypted image with a matryoshka structure according to another embodiment of the present invention.

FIG. 7 shows the construction in which the procedure of the mutual agreement block of FIGS. 3*a* and 3*b* is performed. A user terminal 100 performs the creation and sealing of an encrypted image through a client provided by a server 110. The server is constructed as follows.

The server 110 includes an image management unit 110*a* for managing a user's image and a server's image, an encrypted image creation unit 110*b* for sealing user information and an upper server's image in the server's image and sealing the sealed server's image, a certificate and other information file in the user's image, a user registration management unit 110*c* for managing information on the user registration, and a user information management unit 110*d* for managing hardware information of the user terminal in which dummy data is written upon the request of issuance of the certificate by a user or managing the user's biometric information.

Also, FIG. 8 shows an interlayer authentication system using an encrypted image with a matryoshka structure based on the user's H/W information and the user's biometric information. The authentication system includes a user terminal 100, a server 110, and an upper server 120, and these three constituent elements are connected to one another through the Internet.

The user terminal 100 is equipped with various kinds of central processing unit (CPU) so that installation and execution of application is possible, and can adopt devices (for example, PCs, PDAs, cellular phones, etc.) accessible to the Internet. In addition, since the user terminal can be implemented through the application, a necessary function may be embodied through the programming by those skilled in the art.

Moreover, the server 110 and the upper server 120 have the following construction for the purpose of hierarchical management of the encrypted image.

First, the server 110 includes an image management unit 110*a* for managing a user's image and a server's image, an encrypted image creation unit 110*b* for sealing user information and an upper server's image in the server's image and sealing the sealed server's image, a certificate and other information file in the user's image, a user registration management unit 110*c* for managing information on the user registration, and a user information management unit 110*d* for managing hardware information of the user terminal in which dummy data is written upon the request of issuance of the certificate by a user or managing the user's biometric information.

Such a the server 110 is constructed in the same manner as described above even in the case where a top level server is disposed above the upper server, and the each sealed encrypted image can be opened in only a relevant layer.

Further, FIG. 9 shows a digital ID issuance and authentication system using an encrypted image with a matryoshka structure according to another embodiment of the present invention. The digital ID issuance and authentication system includes a user terminal 130, a digital ID management server 140, and a service providing server 150. These three constituent elements are connected to one another through the Internet.

The digital ID management server 140 includes an image management unit 140*a* for managing a user's image and a digital ID management server's image, an encrypted image creation unit 140*b* for sealing user information in the digital ID management server's image, a digital ID management unit 140*c* for managing information on digital ID registration, and a user information management unit 140*d* for receiving and managing the user information upon the request of the digital ID issuance by the user.

Also, the service providing server 150 includes an authentication information management unit 150*a* for managing authentication information using a digital ID, an image management unit 150*b* for managing a service provider's image, an encrypted image creation unit 150*c* for sealing the authentication information provided from the digital ID management server in the service provider's image, a service approval information management unit 150*d* for managing approval information for provision of a service by a digital ID issuance and authentication procedure using an encrypted image with a matryoshka structure.

The construction of the systems of FIGS. 7, 8 and 9 as described above illustrates only a core construction for implementing the present invention. It is, of course, to be noted that various constructions including a storage medium, a controller, a data input and output means may be included in the systems, if necessary.

As described above, the present invention provides an encrypted image with a matryoshka structure and a mutual agreement authentication system and method using the same, in which a plurality of other encrypted images is inserted into a specifically encrypted image to perform a sequential authentication procedure so as to prevent leakage of authentication information and immediately monitor the illegal use of the authentication information in real time.

The system and method for issuing a digital certificate using an encrypted image according to the present invention has following effects.

The encrypted image with a matryoshka structure and the mutual agreement authentication system and method using the same according to the present invention has the following advantageous effects.

First, leakage of personal information and authentication data can be prevented through the authentication management using an encrypted image with a matryoshka structure.

Second, leakage of personal information and authentication data can be prevented through the authentication management using an encrypted image with a matryoshka structure and a physical address of a user's terminal.

Third, leakage of personal information and authentication data can be prevented through the authentication management using an encrypted image with a matryoshka structure and a user's biometric information.

Fourth, it is possible to strengthen a security function related with a digital ID management system through the authentication management using the encrypted image with a matryoshka structure.

Fifth, even if personal information and authentication data are leaked by a third party's hacking, data validity should be verified in all the layers, and thus the illegal use of personal information and authentication data is prevented through the authentication management using an encrypted image with a matryoshka structure.

Sixth, it is possible to instantly detect the illicit use of the authentication data.

Seventh, since an encrypted image is employed when using a digital ID, a security effect can be increased.

Eighth, authentication information, service associated information and the like by each website are re-encrypted and hierarchically sealed in a user registration image.

Ninth, a user encrypts his or her own information personally in each layer in an authentication system having the matryoshka structure so that equalization of authority and responsibility can be realized in an interlayer authentication information management system.

While the present invention has been described with reference to the particular illustrative embodiments, it is not to be restricted by the embodiments but only by the appended claims. It is to be appreciated that those skilled in the art can change or modify the embodiments without departing from the scope and spirit of the present invention. Therefore, the scope of the present invention should be defined by the appended claims rather than the description set forth herein.

What is claimed is:

1. A method for providing an authentication of a digital identification including user identification and computer server identification, implemented via at least one processor, by using encrypted images with a nested structure having a plurality of encryption layers that define limited authority to open the encrypted images in order to authenticate information contained therein, the method comprising:

performing a mutual agreement sealing procedure between a user terminal and a first computer server corresponding to a first encryption layer of the plurality of encryption layers, wherein the mutual agreement sealing procedure comprises:

requesting, by the user terminal, a first registration of the user identification information and an issuance of a certificate of the first registration from the first computer server;

transmitting, by the first computer server, a request for the user identification information to the user terminal;

transmitting, upon receiving the request from the first computer server, the user identification information from the user terminal to the first computer server;

sealing, by the first computer server, the user identification information and a first server image as a first encrypted image using a first server password, storing the first encrypted image on the first computer server as the first registration, and sending the first encrypted image back to the user terminal as the certificate of the first registration; and sealing, by the user terminal, the first encrypted image received from the first computer server and the user identification information as a second encrypted image using a user terminal password, and storing the second encrypted on the user terminal; and performing a mutual agreement opening procedure between the user terminal and the first computer server, wherein the mutual agreement opening procedure comprises:

sending, by the user terminal, a request for authentication of the digital identification to the first computer server;

opening, by the user terminal, the user identification information and the first encrypted image from the second encrypted image using the user terminal password;

transmitting, by the user terminal, the user identification information and the first encrypted image opened from the second encrypted image to the first computer server;

opening, by the first computer server, the first encrypted image using the first server password and comparing information transmitted with the first encrypted image from the user terminal with information contained in the opened first encrypted image, thereby determining validity of the user identification information; and providing, by the first computer server and upon determining that the user identification information is valid, the authentication of the digital identification to the user terminal.

2. The method according to claim 1, wherein the performing the mutual agreement sealing procedure further comprises sending the second encrypted image to the first computer server as a backup image.

3. The method according to claim 1, wherein the user identification information comprises at least one of hardware information of the user terminal and biometric information of a user.

4. The method according to claim 3, wherein the hardware information of the user terminal comprises a physical address of a storage medium of the user terminal in which dummy data is stored.

5. The method according to claim 1, further comprising performing a mutual agreement sealing procedure between the first computer server and a second computer server corresponding to a second encryption layer of the plurality of encryption layers, wherein the mutual agreement sealing procedure between the first and second computer servers comprises:

requesting, by the first computer server, a second registration of the user identification information and an issuance of a certificate of the second registration from the second computer server;

transmitting, by the second computer server, a request for a first server identification information to the first computer server;

transmitting, upon receiving the request from the first computer server, the first server identification information from the first computer server to the second computer server;

sealing, by the second computer server, the first server identification information and a second server image as a third encrypted image using a second server password, storing the third encrypted image on the second computer server as the second registration, and sending the third encrypted image back to the first computer server as the certificate of the second registration, wherein the third encrypted image is sealed in the first encrypted image during the step of the sealing, by the first computer server, the user identification information and the first server image as the first encrypted image using the first server password, wherein the method further comprises:

performing a mutual agreement opening procedure between the first computer server and the second computer server, wherein the mutual agreement opening procedure between the first and second computer servers comprises:

sending, by the first computer server, a request for authentication of the digital identification to the second computer server;

opening, by the first computer server, the first server identification information and the third encrypted image from the first encrypted image using the first server password;

transmitting, by the first computer server, the first server identification information and the third encrypted image opened from the first encrypted image to the second computer server;

opening, by the second computer server, the third encrypted image using the second server password and comparing information transmitted with the third encrypted image from the first computer server with information contained in the opened third encrypted image, thereby determining validity of the first server identification information; and providing, by the second computer server and upon determining that the first server identification information is valid, the authentication of the digital identification to the first computer server.

6. The method according to claim 5, wherein the first computer server identification information comprises hardware information of the first computer server, and the hardware information comprises a physical address of a storage medium of the first computer server in which dummy data is stored.

7. An apparatus for providing an authentication of a digital identification including user identification and computer server identification by using encrypted images with a nested structure having a plurality of encryption layers that define limited authority to open the encrypted images in order to authenticate information contained therein, the apparatus comprising:

circuitry configured to:

perform a mutual agreement sealing procedure between a user terminal and a first computer server corresponding to a first encryption layer of the plurality of encryption layers, wherein the mutual agreement sealing procedure comprises:

requesting, by the user terminal, a first registration of the user identification information and an issuance of a certificate of the first registration from the first computer server;

transmitting, by the first computer server, a request for the user identification information to the user terminal;

transmitting, upon receiving the request from the first computer server, the user identification information from the user terminal to the first computer server;

sealing, by the first computer server, the user identification information and a first server image as a first encrypted image using a first server password, storing the first encrypted image on the first computer server as the first registration, and sending the first encrypted image back to the user terminal as the certificate of the first registration; and sealing, by the user terminal, the first encrypted image received from the first computer server and the user identification information as a second encrypted image using a user terminal password, and storing the second encrypted on the user terminal; and perform a mutual agreement opening procedure between the user terminal and the first computer server, wherein the mutual agreement opening procedure comprises:

sending, by the user terminal, a request for authentication of the digital identification to the first computer server;

opening, by the user terminal, the user identification information and the first encrypted image from the second encrypted image using the user terminal password;

transmitting, by the user terminal, the user identification information and the first encrypted image opened from the second encrypted image to the first computer server;

opening, by the first computer server, the first encrypted image using the first server password and comparing information transmitted with the first encrypted image from the user terminal with information contained in the opened first encrypted image, thereby determining validity of the user identification information; and providing, by the first computer server and upon determining that the user identification information is valid, the authentication of the digital identification to the user terminal.

8. The apparatus according to claim 7, wherein the mutual agreement sealing procedure further comprises sending the second encrypted image to the first computer server as a backup image.

9. The apparatus according to claim 7, wherein the user identification information comprises at least one of hardware information of the user terminal and biometric information of a user.

10. The apparatus according to claim 9, wherein the hardware information of the user terminal comprises a physical address of a storage medium of the user terminal in which dummy data is stored.

11. The apparatus according to claim 7, wherein the circuitry is further configured to perform a mutual agreement sealing procedure between the first computer server and a second computer server corresponding to a second encryption layer of the plurality of encryption layers, wherein the mutual agreement sealing procedure between the first and second computer servers comprises:

requesting, by the first computer server, a second registration of the user identification information and an issuance of a certificate of the second registration from the second computer server;

transmitting, by the second computer server, a request for a first server identification information to the first computer server;

transmitting, upon receiving the request from the first computer server, the first server identification information from the first computer server to the second computer server; and sealing, by the second computer server, the first server identification information and a second server image as a third encrypted image using a second server password, storing the third encrypted image on the second computer server as the second registration, and sending the third encrypted image back to the first computer server as the certificate of the second registration, wherein the third encrypted image is sealed in the first encrypted image during the step of the sealing, by the first computer server, the user identification information and the first server image as the first encrypted image using the first server password, wherein the circuitry is further configured to perform a mutual agreement opening procedure between the first computer server and the second computer server, wherein the mutual agreement opening procedure between the first and second computer servers comprises:

sending, by the first computer server, a request for authentication of the digital identification to the second computer server;
opening, by the first computer server, the first server identification information and the third encrypted image from the first encrypted image using the first server password;
transmitting, by the first computer server, the first server identification information and the third encrypted image opened from the first encrypted image to the second computer server;
opening, by the second computer server, the third encrypted image using the second server password and comparing information transmitted with the third encrypted image from the first computer server with information contained in the opened third encrypted image, thereby determining validity of the first server identification information; and
providing, by the second computer server and upon determining that the first server identification information is valid, the authentication of the digital identification to the first computer server.

12. The apparatus according to claim 11, wherein the first computer server identification information comprises hardware information of the first computer server, and the hardware information comprises a physical address of a storage medium of the first computer server in which dummy data is stored.

13. A non-transitory computer-readable medium having embodied thereon a program, which when executed by a computer causes the computer to execute a method for providing an authentication of a digital identification including user identification and computer server identification by using encrypted images with a nested structure having a plurality of encryption layers that define limited authority to open the encrypted images in order to authenticate information contained therein, the method comprising:
performing a mutual agreement sealing procedure between a user terminal and a first computer server corresponding to a first encryption layer of the plurality of encryption layers, wherein the mutual agreement sealing procedure comprises:
requesting, by the user terminal, a first registration of the user identification information and an issuance of a certificate of the first registration from the first computer server;
transmitting, by the first computer server, a request for the user identification information to the user terminal;
transmitting, upon receiving the request from the first computer server, the user identification information from the user terminal to the first computer server;
sealing, by the first computer server, the user identification information and a first server image as a first encrypted image using a first server password, storing the first encrypted image on the first computer server as the first registration, and sending the first encrypted image back to the user terminal as the certificate of the first registration; and
sealing, by the user terminal, the first encrypted image received from the first computer server and the user identification information as a second encrypted image using a user terminal password, and storing the second encrypted on the user terminal;
performing a mutual agreement opening procedure between the user terminal and the first computer server, wherein the mutual agreement opening procedure comprises:
sending, by the user terminal, a request for authentication of the digital identification to the first computer server;
opening, by the user terminal, the user identification information and the first encrypted image from the second encrypted image using the user terminal password;
transmitting, by the user terminal, the user identification information and the first encrypted image opened from the second encrypted image to the first computer server;
opening, by the first computer server, the first encrypted image using the first server password and comparing information transmitted with the first encrypted image from the user terminal with information contained in the opened first encrypted image, thereby determining validity of the user identification information; and
providing, by the first computer server and upon determining that the user identification information is valid, the authentication of the digital identification to the user terminal.

14. The non-transitory computer-readable medium according to claim 13, wherein the performing the mutual agreement sealing procedure further comprises sending the second encrypted image to the first computer server as a backup image.

15. The non-transitory computer-readable medium according to claim 13, wherein the user identification information comprises at least one of hardware information of the user terminal and biometric information of a user.

16. The non-transitory computer-readable medium according to claim 15, wherein the hardware information of the user terminal comprises a physical address of a storage medium of the user terminal in which dummy data is stored.

17. The non-transitory computer-readable medium according to claim 13, wherein the method further comprises performing a mutual agreement sealing procedure between the first computer server and a second computer server corresponding to a second encryption layer of the plurality of encryption layers, wherein the mutual agreement sealing procedure between the first and second computer servers comprises:
requesting, by the first computer server, a second registration of the user identification information and an issuance of a certificate of the second registration from the second computer server;
transmitting, by the second computer server, a request for a first server identification information to the first computer server;
transmitting, upon receiving the request from the first computer server, the first server identification information from the first computer server to the second computer server;
sealing, by the second computer server, the first server identification information and a second server image as a third encrypted image using a second server password, storing the third encrypted image on the second computer server as the second registration, and sending the third encrypted image back to the first computer server as the certificate of the second registration,
wherein the third encrypted image is sealed in the first encrypted image during the step of the sealing, by the first computer server, the user identification information and the first server image as the first encrypted image using the first server password, wherein the method further comprises:

performing a mutual agreement opening procedure between the first computer server and the second computer server, wherein the mutual agreement opening procedure between the first and second computer servers comprises:

sending, by the first computer server, a request for authentication of the digital identification to the second computer server;

opening, by the first computer server, the first server identification information and the third encrypted image from the first encrypted image using the first server password;

transmitting, by the first computer server, the first server identification information and the third encrypted image opened from the first encrypted image to the second computer server;

opening, by the second computer server, the third encrypted image using the second server password and comparing information transmitted with the third encrypted image from the first computer server with information contained in the opened third encrypted image, thereby determining validity of the first server identification information; and providing, by the second computer server and upon determining that the first server identification information is valid, the authentication of the digital identification to the first computer server.

18. The non-transitory computer-readable medium according to claim 17, wherein the first computer server identification information comprises hardware information of the first computer server, and the hardware information comprises a physical address of a storage medium of the first computer server in which dummy data is stored.

* * * * *